United States Patent [19]

Niino et al.

[11] Patent Number: 4,778,649
[45] Date of Patent: Oct. 18, 1988

[54] METHOD OF PRODUCING COMPOSITE MATERIALS

[75] Inventors: Masayuki Niino, Sendai; Nobuyuki Yatsuyanagi, Miyagi; Jun Ikeuchi; Nobuhiro Sata, both of Sendai; Tohru Hirano; Kanichiro Sumiyoshi, both of Sakai, all of Japan

[73] Assignees: Agency of Industrial Science and Technology, Tokyo; Daikin Industries, Ltd., Osaka, both of Japan

[21] Appl. No.: 82,487

[22] Filed: Aug. 7, 1987

[30] Foreign Application Priority Data

Aug. 8, 1986 [JP] Japan ................. 61-187370

[51] Int. Cl.⁴ .......................................... B22F 7/00
[52] U.S. Cl. .......................................... 419/9; 75/230; 75/244; 269/60; 419/10; 419/12; 419/34; 419/45; 419/63; 428/547; 428/610
[58] Field of Search ............... 428/547, 610; 75/230, 75/244; 419/9, 10, 12, 63, 45, 34; 264/60

[56] References Cited

U.S. PATENT DOCUMENTS

| | | | |
|---|---|---|---|
| 3,147,087 | 9/1964 | Eisenlohr | 29/191.2 |
| 3,446,643 | 5/1969 | Karlak | 428/547 |
| 3,467,588 | 9/1969 | Gebler et al. | 204/181 |
| 3,802,850 | 4/1974 | Clougherty | 428/547 |
| 3,804,034 | 4/1974 | Stiglich | 428/547 |
| 3,836,341 | 9/1974 | Saltzman et al. | 428/547 |
| 3,975,165 | 8/1976 | Elbert et al. | 428/550 |
| 4,075,364 | 2/1978 | Panzera | 427/34 |
| 4,101,712 | 7/1978 | Bonford et al. | 428/547 |
| 4,107,392 | 8/1978 | Aoki et al. | 428/547 |
| 4,357,393 | 11/1982 | Tsuda et al. | 428/547 |
| 4,391,860 | 7/1983 | Rotolico et al. | 427/423 |
| 4,587,177 | 5/1986 | Toaz et al. | 428/614 |
| 4,588,607 | 5/1986 | Matarese et al. | 427/34 |
| 4,601,956 | 7/1986 | Dohnomoto | 428/614 |
| 4,713,300 | 12/1987 | Sowman et al. | 428/547 |

*Primary Examiner*—Stephen J. Lechert, Jr.
*Attorney, Agent, or Firm*—Birch, Stewart, Kolasch & Birch

[57] ABSTRACT

A method of producing a material having a layer of ceramic as a first component, a layer of a metal as a second component and an intermediate layer lying between said layers and including said first and second components in continuous gradient ratios so that the properties of the material may change continuous, including a step of forming said intermediate layer by igniting a powder mixture of metallic and nonmetallic constitutive elements of said ceramic component and said metal component so as to cause a synthetic reaction in the powder mixture.

16 Claims, 6 Drawing Sheets

4,778,649

METHOD OF PRODUCING COMPOSITE MATERIALS

BACKGROUND OF THE INVENTION

The present invention relates to a method of producing monolayered or multilayered composite materials consisting of ceramic and metal, ceramic and ceramic, or the like, and more particularly, to a method of producing functionally gradient materials with properties varying continuously in the direction of the thickness by adjusting the distribution of components and the structure thereof through the synthesis effected by a self-propagating reaction of the mixed fine particles including constitutive elements of these ceramics and metals, etc.

One of the recent important technological themes in the fields of aeronautics, space engineering, and the nuclear fusion reactor, etc., is the development of a super heat-resistant material with superior heat-blocking properties, and that of a heat-blocking material to be used in a light-weight aircraft. As the producing method of such a heat-blocking material, there is conventionally known the method of coating the surface of a metal and an alloy with ceramics or the like; for example, the surface of a Ni-base super alloy is coated with MCrAlY (wherein, M is a metal) as a relaxation layer and $ZrO_2.Y_2O_3$ in this order according to a plasma-coating method. Furthermore, an ion-plating method wherein a heat-blocking material is fixed by impact on a substrate by vaporization under a vacuum of $10^{-2}$ to $10^{-3}$ Torr; a plasma-CVD (Chemical Vapor Deposition) method wherein a heat-blocking material is formed by vapor-phase synthesis; and an ion-beam method have been used frequently.

However, these conventional methods, i.e. the plasma coating method, ion-plating method, plasma-CVD method and ion-beam method are defective because of low efficiency, since much time is required to form a thick coating because the coating layer obtained per an unit time is very thin. Such a defect is revealed more remarkably as the surface area of the substrate to be coated becomes larger. Furthermore, there is another defect in that the ion-plating method and the plasma-CVD method require a large-scale chamber and additional equipment, and the plasma-coating method requires a large amount of energy to heat and fuse the coating material.

Though the monlayered or the multilayered coating obtained by the above methods should naturally be superior in adhesion and against a thermal stress, none of the composite materials provided by these conventional coating or plating method has been proved to have a stress relaxing structure based on a theoretical calculation. The structure of such materials have been obtained by merely varying the composition thereof stepwise and does not have superior adhesion, since the compositional distribution and temperature gradient in such materials are not controlled, in the producing process, to be continuous so that the structure may exhibit minimum thermal stress distribution corresponding to a temperature potential at each portion of the material under working conditions.

Accordingly, these composite materials have problems such as exfoliation of the coating layer due to the thermal stress caused repeatedly during operation and the variation by the passage of time, and the deterioration of corrosion resistance due to the generation of cracks.

SUMMARY OF THE INVENTION

The object of the present invention is to provide a method of readily producing materials in heat resistance, corrosion resistance, adhesion, and thermal-stress fracture resistance at low cost and in a short time.

In order to form an intermediate layer between ceramic as a first component and a metal or other ceramic as a second component, in which the ratio of both components varies continuously, the present inventors, after repeated experiments and studies, adopted what is called a self-propagating reaction, wherein the synthetic reaction of the components is carried out only by the self-heating of the mixed fine particles of metallic and nonmetallic constitutive elements of the ceramics after ignition. In the experimental process, the inventors found that such a material can be obtained with a residual stress which cancels a thermal stress occurring under a working condition of high temperature, by the following process: (1) determining a concentration-distribution function, a distribution parameter, and a boundary condition of a heat conduction equation of each of both the components; (2) calculating the specific stress R (thermal stress $\sigma$ divided by mixture average compression fracture stress $\sigma y$) of each portion of such a material under working conditions using heat conductivity ($\lambda$), the Young's modulus (E), etc.; and (3) adjusting the mixture ratio of both the components so as to flaten and minimize this specific stress distribution.

The method of a first embodiment according to the present invention is characterized in producing a material having a first layer of ceramic as a first component, a second layer of a metal as a second component and an intermediate layer lying between the first and second layers and including said first and second components in continuous gradient ratios so that the properties of the material may change continuously; including a step to form said intermediate layer by igniting the mixture of powders of metallic and nonmetallic constitutive elements of said ceramic and said metal and causing a synthetic reaction of the powder mixture.

The method of a second embodiment according to the present invention is characterized in producing a material having a first layer of ceramic as a first component, a second layer of ceramic as a second component and an intermediate layer lying between the first and second layers and including said first and second components in continuously gradient ratios so that the properties of the material may change continuously; including a step to form said intermediate layer by igniting the mixture of powders of metallic and nonmetallic constitutive elements of the ceramic as the first component and the other ceramic as the second component and causing a synthetic reaction of the powder mixture.

The method of a third embodiment according to the present invention is characterized in producing a material having a first layer of ceramic as a first component, a second layer of ceramic as a second component and an intermediate layer lying between the first and second layers and including said first and second components in continuous gradient ratios so that the properties of the material may change continuously; including a step to form said intermediate layer by igniting the mixture of powders of metallic and nonmetallic constitutive elements of the ceramic as the first component and those of metallic and nonmetallic constitutive elements of the other ceramic as the second component and causing a synthetic reaction of the powder mixture.

The composition of the present invention will be described in more detail according to the appended drawings.

FIG. 1 illustrates an infinite flat plate of a dimensionless thickness of $0 \leq x \leq 1$. In said infinite flat plate, the heat conductivity equation, the concentration distribution functions $g_A(x)$, $g_B(x)$ of two components A and B, and the physical property value function f(x) are defined by equations (1) to (4), respectively.

$$\frac{d}{dx} \lambda(x) \frac{dT}{dx} = 0 \tag{1}$$

The boundary condition in using the material is:

T(0)=1500K

T(1)=300K

If the concentration distribution function is assumed to be as follows:

$$g_A(x) = x^n \tag{2}$$

$$g_B(x) = 1 - x^n \tag{3}$$

the physical property value function is represented as follows:

$$f(x) = P_A x^n + P_B(1 - x^n) \tag{4}$$

(where $P_A$ and $P_B$ represent the following physical property values of components A and B, respectively: heat conductivity $\lambda$, the Young's modulus E, and thermal expansion coefficient $\alpha$).

In the above equations, 'n' is a distribution form parameter, and the cases of "(I) $0<n<1$", "(II) $n=1$", and "(III) $1<n$" are shown in FIG. 2, which illustrates the equations (2) and (3), assuming the position of $x=L$ to be an origin, and a range of (1—L) to be a full scale of the abscissa axis.

Next, the equations (1) and (2) are worked out based on the following four assumptions:
(i) a stationary condition is held,
(ii) there exists an elastic deformation,
(iii) the dependency of the physical properties of the material on the temperature is taken into account, and
(iv) the physical property value of the material is determined based on the mixture average rule of each component.

Then, a temperature distribution T(x), a thermal stress distribution $\sigma(x)$, and a specific stress distribution R(x) are represented by equations (5), (6), and (7).

$$T(x) = K \cdot \int_0^x d\tau / \{(\lambda_A - \lambda_B)\tau^n + \lambda_B\} + 1500 \tag{5}$$

wherein, $$K = 1200 / \int_0^1 d\tau / \{(\lambda_A - \lambda_B)\tau^n + \lambda_B\} \tag{6}$$

$$\sigma(x) = -E(x)\alpha(x)\{T(x) - 300\}$$

here, the equation (4) is adopted:

$$E(x) = E_A x^n + E_B(1 - x^n)$$

$$\alpha(x) = \alpha_A x^n + \alpha_B(1 - x^n)$$

where $E_A$ and $E_B$ are the functions of $\sigma(x)$, when taking an elastic deformation into account.

$$R(x) = \sigma(x) / \sigma_Y(x) \tag{7}$$

wherein, $\sigma_Y$ is a mixture average compression fracture stress.

From the calculation results of these fundamental equations, it has become obvious that making the value of $R(x)_{max}$ as small as possible and making uniform the distribution thereof is essential in obtaining a material with excellent bonding strength. The present invention is characterized by adjusting the mixture ratio of the two components A and B or by adding a third component in such an optimum way as to reduce the stress level and to flatten the specific stress distribution R(x) of the intermediate layer in which the structure and the content of each component thereof are varied continuously. If the specific stress distribution R is calculated numerically by each of the equations after determining the two components A and B and varying the distribution-form parameters n and the original position L variously, n and L which minimize the specific stress distribution R can be obtained individually.

A result of obtaining the relationship between n and $R(x)_{max}$ concerning the typical combination of ceramics/metal has revealed that, in order to minimize the thermal stress with a group of two components, it is preferable that 'n' is 0.5 and more ($n \geq 0.5$), and it is more adequate that 'n' is positioned within a range of $0.5 \leq n \leq 5$ when taking into account the bonding strength in the case of $x=1$.

Next, the case in which $TiB_2$ is determined as the first component (component B) of a material, and Cu is determined as the second component (component B) according to the present invention will be described specifically. 'n' and 'L' which minimize the specific stress distribution R are obtained as $n=0.8$, and $L=0.1$ by said numerical calculation. FIG. 3 shows the component distribution obtained by equations (2) and (3) concerning $TiB_2$ and Cu included in the material at that time. In FIG. 3, the range of $x=0.0$ to 0.1 corresponds to the top portion of the coating layer of $TiB_2$ content 100%; the range of $x=0.1$ to 1.0 corresponds to an intermediate layer in which $TiB_2$ reduces gradually and Cu increases gradually; and the position of $x=1.0$ corresponds to the surface of a substrate (copper) of Cu content 100% respectively. Then, the heat conductivity $\lambda$, the Young's modulus E, and the thermal expansion coefficient $\alpha$, obtained by the equation (4), of the top portion of the coating layer and of the intermediate layer are shown in FIG. 4. The temperature distribution T, thermal stress distribution $\sigma$, and specific stress distribution R which are obtained by substituting the values shown in FIG. 4 into the equations (5), (6) and (7) in accordance with a realistic thermal analysis on elasticity and plasticity are as shown in FIG. 5. As for T of FIG. 5 as same as for that of FIG. 1, the temperature of the top portion of the coating layer of $x=0.0$ to 0.1 which is exposed to high temperature circumstances reaches 1500K, and it reduces gradually in the intermediate layer to 300K at the surface of the substrate of $x=1.0$. Accordingly, the material wherein both $TiB_2$ and Cu components are adjusted in such a mixture ratio can exhibit a superior bonding interface and strength even under working circumstances of high temperature.

BRIEF DESCRIPTION OF THE DRAWINGS

The objects and characteristics of the present invention will become apparent from the following description in conjunction with the preferred embodiments thereof referring to the appended drawings, in which.

DETAILED DESCRIPTION OF THE PREFERRED EMBODIMENTS

Figure 1:
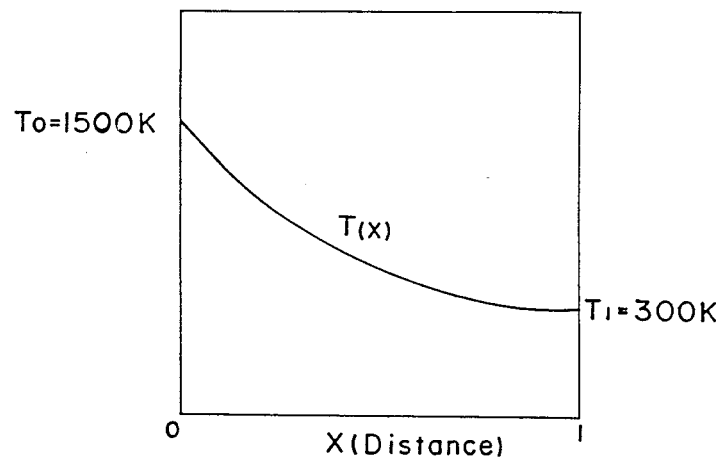
FIG. 1 is a diagram of an infinite flat plate of a dimensionless thickness of $0 \leq x \leq 1$.
Figure 2:
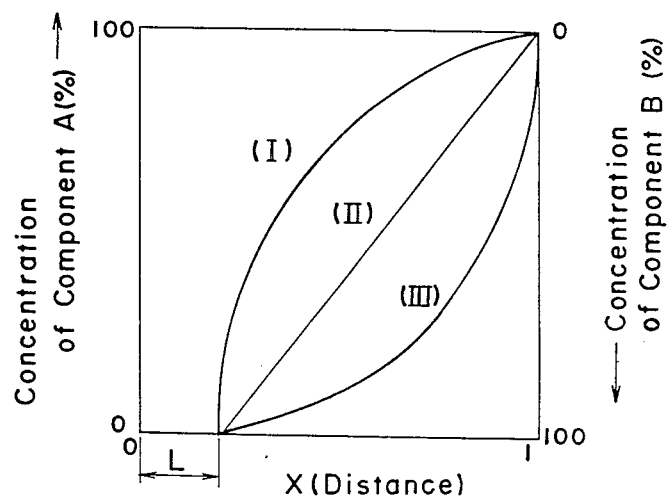
FIG. 2 is a schematic diagram showing concentration distributions of components A and B.

Before the description of the present invention proceeds, it is to be noted that the same parts are designated by the same reference numerals throughout the appended drawings.

Figure 3:
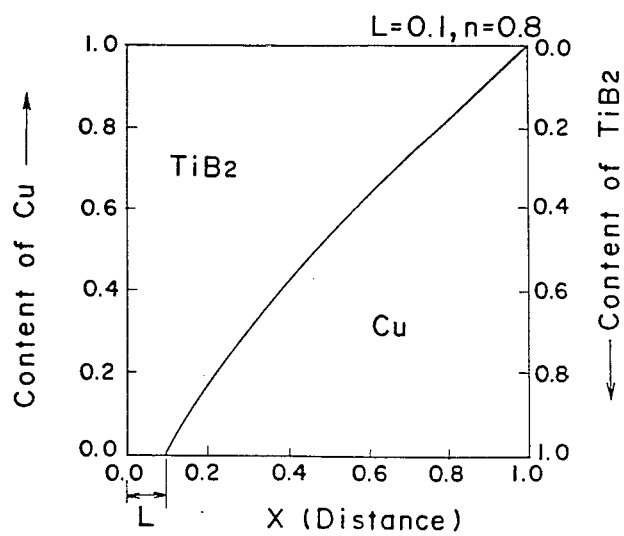
FIG. 3 is a diagram showing a component distribution on the conditions of the distribution form parameter of $n=0.8$, and $L=0.1$, $A=Cu$, $B=TiB_2$.
Figure 4:
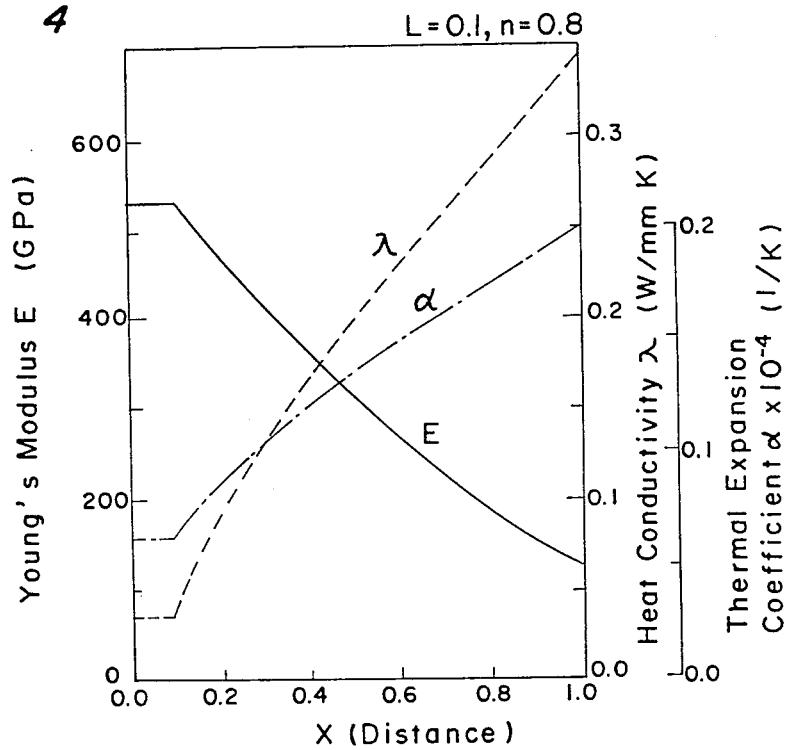
FIG. 4 is a diagram showing physical property values of the continuous layers.
Figure 6:
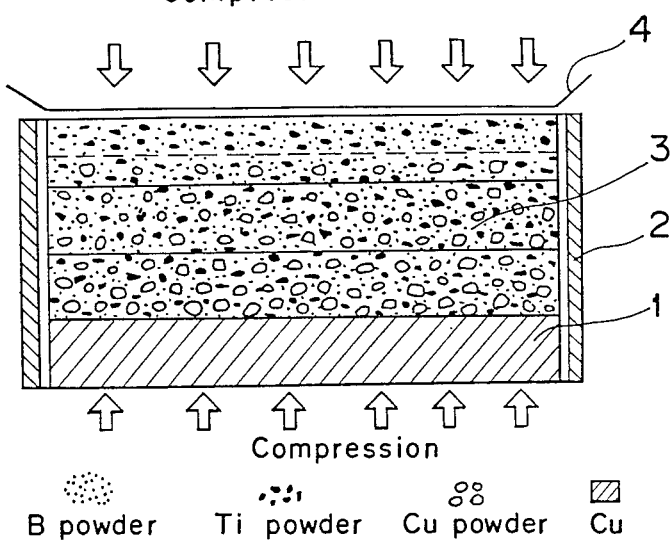
FIG. 6 illustrates an example of the producing method according to the present invention.
Figure 7:
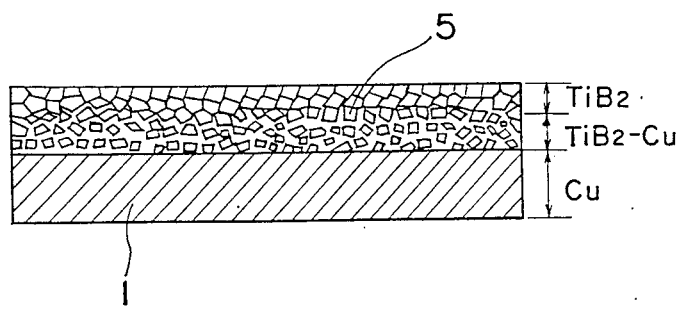
FIG. 7 is a cross section view of a produced material.
Figure 8:
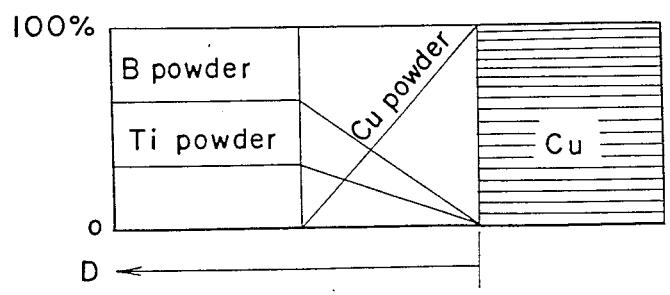
FIG. 8 shows a mixture ratio of the thickness direction of raw material powders.

As shown in FIG. 6, copper alloy 1 to be coated is enclosed with a heat-resisting frame 2, and said frame 2 is filled with the powders of Ti and B which are the constitutive elements of $TiB_2$ as the first component and those of Cu as the second component, varying the mixture ratio in the thickness direction D continuously as shown in FIG. 8. Said mixture ratio is so determined so that the component distribution ($n=0.8$, $L=0.1$) as shown in FIG. 3 can be obtained, and actually the mixed fine particles of different mixture compositions are laminally filled in sequence to lead to layers of a regular thickness as shown in FIG. 6, since it is difficult to regulate the mixture ratio so as to vary the ratio precisely in a continuous way. A pressure of more than 200 kg/cm$^2$ is applied to every layer vertically so as to compress the fine particles thereof. After completing the laminated filling, the whole is put in a container and treated by vacuum degassing. Then, during further compression in the direction shown by arrows with a pressure of more than 200 kg/cm$^2$, an ignition coil 4 put over the upper surface of the compressed powder 3 is ignited, thereby, said compressed powder 3 is also ignited. Then, the fine particles Ti and B start a synthetic reaction to form $TiB_2$, said synthetic reaction proceeding rapidly in a sheet state toward the surface of the copper alloy 1 only by the enormous self-generating reaction heat. In this synthetic process of forming $TiB_2$, the Cu powders are also fused by said reaction heat, and in the intermediate layer, a matrix of a double phase structure containing $TiB_2$ and Cu is formed, thereby a coating layer of high density can be obtained due to the effect of said applied pressure. In such an obtained coating layer 5, as its composition, the content of $TiB_2$ is 100% on the surface layer portion, and that of Cu is gradually increased inside and reaches 100% on the surface of copper alloy 1. In such a way, the synthesis and formation of a material wherein the first and the second components are ceramic $TiB_2$ and metal Cu respectively is settled in an instant; thus, the production is completed after letting the pressure out and cooling.

As an effective igniting method to initiate self-propagating reaction, is selected a method wherein metallic wires are stretched around the surface or the inside of the powder mixture, and are fed with electricity for an instant, thereby igniting the powder mixture. The metallic wires are preferably of a mixture composing metals such as Ti, Zr, and the like, in order to protect the coating layer from contamination. It is possible to form the surface of the coating layer so as to be flat or in an optional configuration by initiating said reaction from an adequate position inside said mixture. Moreover, a synthetic layer of high density can be formed by correcting the volume shrinkage due to the reaction under the pressure of a compression spring, hydraulic power, gasses, etc. Said synthesis is carried out by applying pressure to the mixture perpendicularly to the coating surface, and at the same time, igniting said mixture on the plane intersecting perpendicularly to the pressure application direction, and advancing the synthesis in said direction. Preferably, said pressure is applied in parallel to the advancing direction of the heating reaction, though said reaction may be advanced along the coating plane by igniting the edge in the case of forming a relatively thin synthesized coating layer in a wide area. Preferably, as an alternative of the coating method of carrying out the reaction on a substrate metal to unite the substrate metal and a material with a predetermined component distribution, alloy powders may be distributed in a layer style, and fused by the reaction heat of synthesis, and thereby these fused alloy powders may be substituted for a substrate metal.

Figure 5:
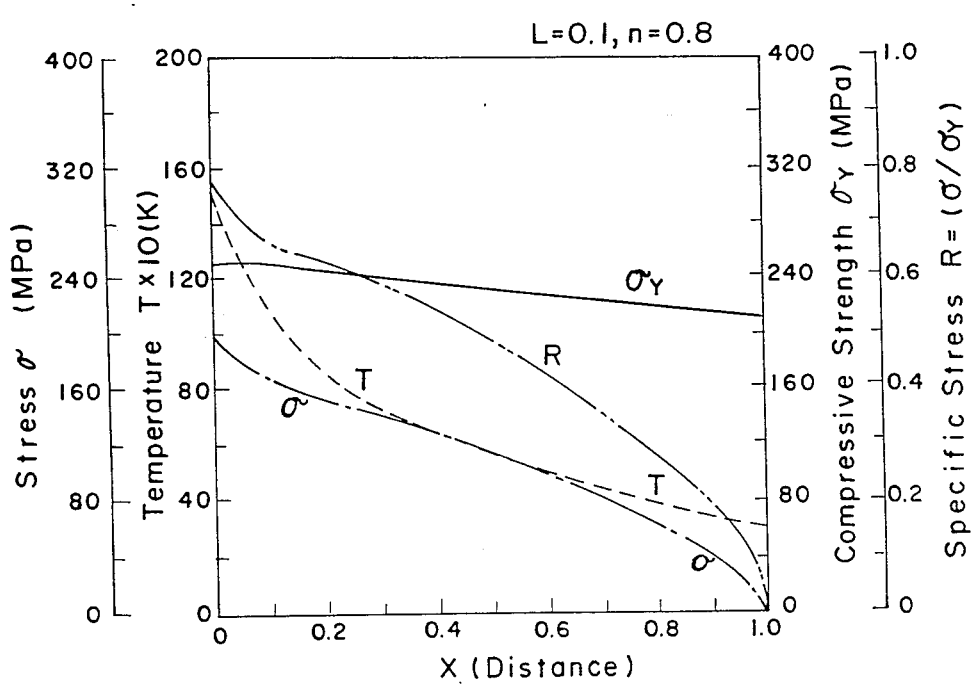
FIG. 5 is a diagram showing values of temperature T, stress $\sigma$, and specific stress $\sigma/\sigma_Y$ of the continuous layers.
Figure 9:
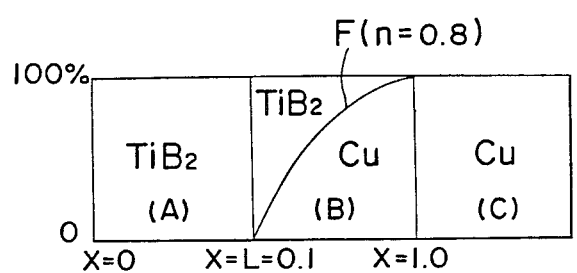
FIG. 9 shows a component distribution of the produced material.
Figure 10:
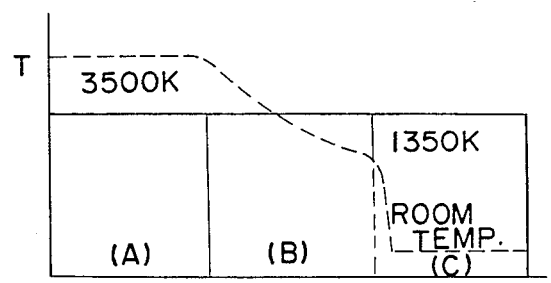
FIG. 10 shows a temperature distribution of the material immediately after synthesizing and forming thereof.
Figure 11:
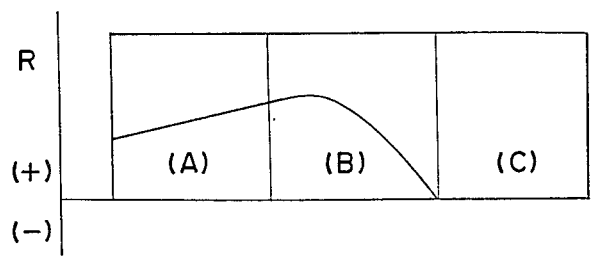
FIG. 11 shows a residual stress distribution of the material after being produced.
Figure 12:
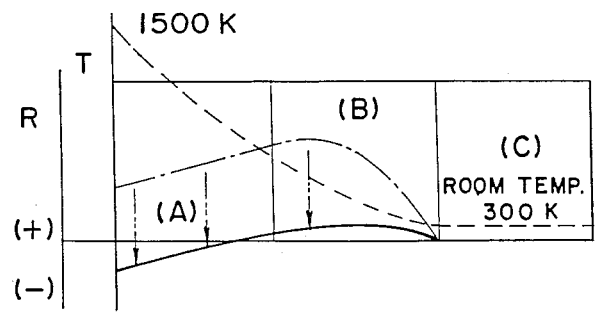
FIG. 12 shows a distribution of stress which occurs in the material (during working)
Figure 13A:
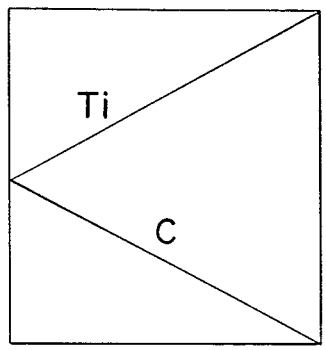
FIGS. 13(a) and (b) to 16(a) and (b) show schematic views of materials, showing the respective compositional distributions before the reaction in (a)s, those after the reaction in (b)s.
Figure 13B:
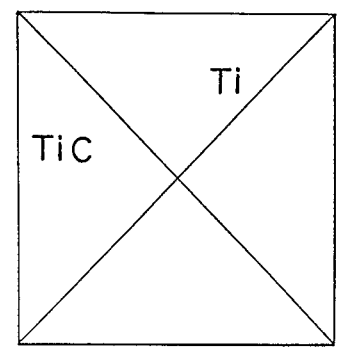
Figure 14A:
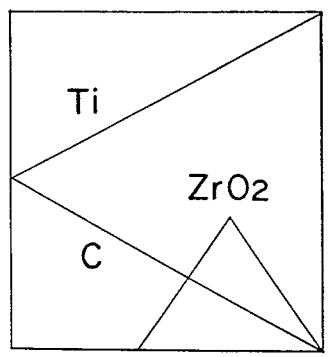
Figure 14B:
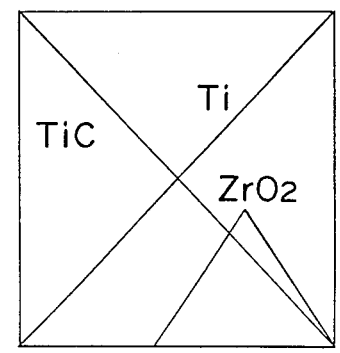
Figure 15A:
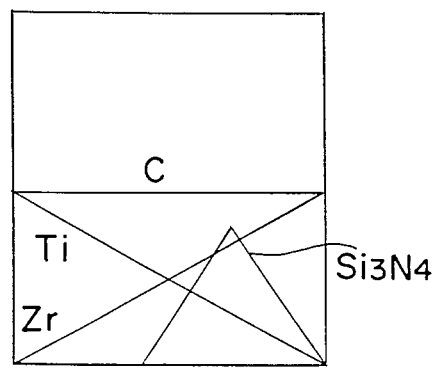
Figure 15B:
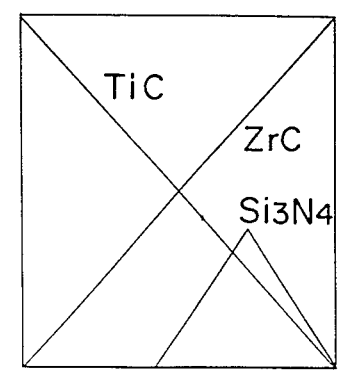
Figure 16A:
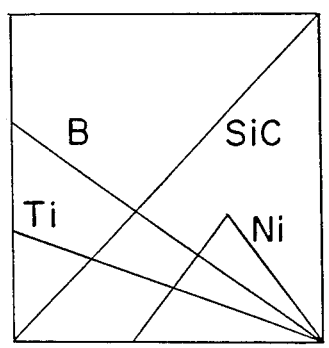
Figure 16B:
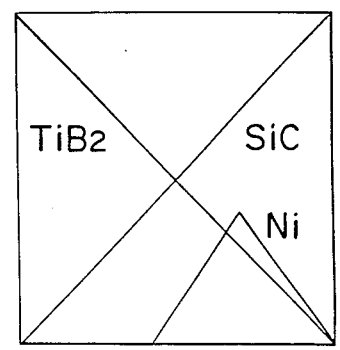

FIG. 9 is a schematic view of the component distribution of a produced material; in which the bottom line represents X coordinate corresponding to that of FIG. 3, and the boundary line F between $TiB_2$ and Cu in the region (B) corresponds precisely to the curve line of $n=0.8$ of FIG. 3. FIG. 10 shows an estimated temperature distribution (refer to a broken line) of the material just after the synthesis and formation; FIG. 11 shows the result of calculating according to the thermal analysis a stress residual in the material which has been cooled rapidly from the estimated temperatures to a room temperature, said residual stress showing a tensile stress as shown in this figure. FIG. 12 shows by a solid line a stress which occurs in said material under a working temperature circumstance, that is, an imaginary circumstance of a rocket engine in operation. From this figure, the following can be understood. Though a compression thermal stress similar to $\alpha$ of FIG. 5 occurs in said material due to the same temperature distribution, expressed by a broken line, as those of FIGS. 1 and 5, this compression thermal stress is counterbalanced by said residual tensile stress, whose curve corresponds to that of FIG. 11 and is expressed by a single-dotted chain line, thereby the total stress generated in the operation can be largely relaxed as shown by arrow marks. In other words, the mixed powders of constitutive elements Ti and B included in the first component TiB$_2$ is mixed with the powder of Cu included in the second component Cu so as to have an optimum composition distribution, and the above mixture is ignited, thereby the synthetic reaction is carried out only by self-generated heating, and the synthesis and formation of a material whose properties change continuously is completed in an instant, and at the same time, such a residual stress as cancels a thermal stress which will occur under working conditions is added to said material, thereby remarkable adhesion and thermal-stress fracture resistance are obtained.

The production method according to the present invention can be applied generally to various kinds of materials consisting of the combination of ceramic and metal or that of ceramic and ceramic without the necessity of being restricted to the above embodiments. Though materials which can be produced are described in detail in the literature ("Energy-Saving Manufacture of Inorganic compounds with High Melting Temperature Sunshine Journal No. 4, (1985) 6, Japan"), some of them require preheating at high temperature in the producing process, and some of them must be reacted in a high-pressure container, and others deposit defective compound in the product. In view of this, available materials without said defects are: for example, TiB$_2$-Ti(TiB), ZrB$_2$-Zr(ZrB$_2$), ZrB$_2$-Cu(ZrB$_2$), NbB$_2$-Cu(NbB$_2$), Ta$_3$B$_4$-Cu(Ta$_3$B$_4$), TiB$_2$-Al(TiB$_2$) in a group of boride-metal; TiC-Ti(TiC), ZrC-Zr(ZrC), TiC-Cu(TiC), ZrC-Cu(ZrC) in a group of carbides-metal; TiC-ZrC, TiB-SiC, TiB-ZrB, and so on in a group of ceramics-ceramics. The compounds in the parentheses represent substances which are distributed continuously with metal. With these materials, as well as said embodiments, it is possible to determine distribution parameters such as (n, L), etc. of each component so as to flatten and minimize a specific stress distribution R after predetermining the temperature distribution T(x) of the materials in the operation (See FIG. 1). In the case of boride and carbides with high heat-conductivity, it is possible to feed oxide and nitride with low heat-conductivity into the ceramic layer in advance or to preheat one side of the ceramic layer so as to increase the thermal gradient during production. It is also possible to feed partially ceramic powders or metal powders into the intermediate layer, so as to flatten and minimize the specific stress distribution.

Figure 17A:
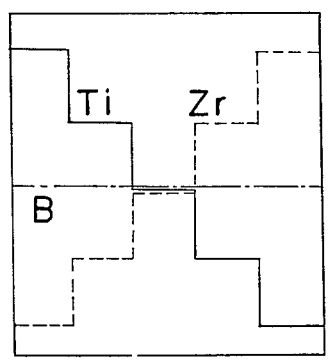
FIGS. 17(a) and (b) show the characteristics of the producing method according to the present invention.
Figure 17B:
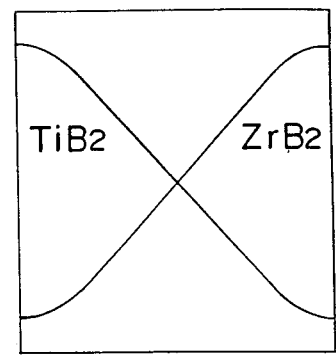

FIGS. 13 to 16 illustrate respective examples of said materials in binary and ternary systems, representing schematic compositional distributions before and after reactions in (a)s and (b)s, respectively. More particularly, FIGS. 13(a) and (b) illustrate an example of the ceramic-metal group; FIGS. 14(a) and (b) the ceramic-metal (ceramic) group; FIGS. 15(a) and (b) the ceramic-ceramic (ceramic or metal) group; and FIGS. 16(a) and (b) the ceramic-ceramic (metal) group. Though the fine powder of ceramic as the second component is made from the mixture of metallic element Zr and nonmetallic element C composing ceramic ZrC as its raw materials, the fine particles of ceramic ZrC itself may be available. FIGS. 17(a) and (b) illustrate schematic composition distributions of a metal of another type before and after reaction, respectively. From these figures, it is found that since the synthesis and the formation of ceramic is carried out by the self-propagating reaction of raw materials instantaneously according to the producing method of the present invention, a staircase-shaped compositional distribution obtained on pressing the raw material powders describes a smooth curve line after the reaction, because of the short range dispersion and substance movement due to the reaction. As described above, the producing method according to the present invention has an advantage that a continuous composition gradient can be readily obtained.

As has been apparent from the above description, the material-producing method according to the present invention has many advantages and will contribute much to the production of such a composite material as has a continuous properties gradient, i.e. a functionally gradient material, due to its construction of the intermediate layer of the composite material wherein the ratio of a first component and a second component thereof varies continuously is formed by means of an instantaneous synthetic reaction caused only by self-heating after igniting the mixture of powder of metallic and nonmetallic constitutive elements of cermic as the first component and that of metal or other ceramic as the second component. Such advantages are as follows: the thick material of layers can be readily formed on a large area at low cost and in a short time without requiring heat energy other than the self-generated heat of the component powder. Furthermore, even though a compositional distribution of raw material powders is like a staircase shape to some degree before the reaction, a gradient distribution can be obtained due to the synthetic reaction, and at the same time, the regulation of the mixture ratio of the components allows said intermediate layer to gain such a residual stress as cancels a thermal stress which generates during the operation. Furthermore, a substrate metal can be coated with the composite material at an ordinary temperature, thereby expanding the range of design materials design.

Although the present invention has been described in connection with preferred embodiments thereof, many variations and modifications will now become apparent to those skilled in the art. It is preferred, therefore, that the present invention is limited not to the specific disclosure herein, but only to the appended claims.

What is claimed is:
1. A method of producing a composite material which comprises:
    forming a first layer of ceramic which comprises metallic and nonmetallic elements as a first component,
    forming thereon a second layer which comprises a metal as a second component, and
    forming an intermediate layer between said first and second layers, wherein said intermediate layer includes a powder mixture of said first and second components in ratios based on a continuous gradient so that the properties of said composite material may change along said continuous gradient, wherein said intermediate layer is formed by igniting said powder mixture of said first component and said second component so as to cause a synthetic reaction in said powder mixture to produce said composite material.
2. A method of producing a composite material as defined in claim 1, which further includes determining composition and temperature property distributions of said intermediate layer so that said composite material is adapted for conditions in which said composite material is used and so that the residual stress of said intermediate layer counterbalances other stresses generated under said conditions.

3. A method of producing a composite material which comprises:
forming a first layer of a first ceramic which comprises metallic and nonmetallic components as a first component,
forming thereon a second layer which comprises a second ceramic as a second component, and
forming an intermediate layer between said first and second layers, wherein said intermediate layer includes a powder mixture of said first and second components in ratios based on a continuous gradient so that the properties of said composite material may change along said continuous gradient, wherein said intermediate layer is formed by igniting said powder mixture of said first component and said second component so as to cause a synthetic reaction in said powder mixture to produce said composite material.

4. A method producing a material as defined in claim 3, which further includes determining composition and temperature property distributions of said intermediate layer so that said composite material is adapted for conditions in which said composite material is used and so that the residual stress of said intermediate layer counterbalances other stresses generated under said conditions.

5. A method of producing a composite material which comprises:
forming a first layer of a first ceramic which comprises metallic and nonmetallic components as a first component,
forming thereon a second layer of a second ceramic which comprises metallic and nonmetallic elements as a second component, and
forming an intermediate layer between said first and second layers, wherein said intermediate layer includes a powder mixture of said first and second components in ratios based on a continuous gradient so that the properties of said composite material may change along said continuous gradient, wherein said intermediate layer is formed by igniting said powder mixture of said first component and said second component so as to cause a synthetic reaction in said powder mixture to produce said composite material.

6. A method producing a material as defined in claim 5, which further includes determining composition and temperature property distributions of said intermediate layer so that said composite material is adapted for conditions in which said composite material is used and so that the residual stress of said intermediate layer counterbalances other stresses generated under said conditions.

7. A method of producing a composite material as defined in claim 1, wherein said intermediate layer is formed so that the amount of said first component increases in a direction approaching said first layer and the amount of said second component increases in a direction approaching said second layer, and wherein said powder mixture is ignited by feeding electricity through metallic wires contacting said powder mixture.

8. A method of producing a composite material as defined in claim 7, wherein said first and second components comprise, respectively, a member selected from the group consisting of $TiB_2$ and Cu; $TiB_2$ and Ti; $ZrB_2$ and Zr; $ZrB_2$ and Cu; $NbB_2$ and Cu; $Ta_3B_4$ and Cu; $TiB_2$ and Al; TiC and Ti; ZrC and Zr; TiC and Cu; and ZrC and Cu.

9. A method of producing a composite material as defined in claim 8, wherein said first and second components comprise, respectively, $TiB_2$ and Cu.

10. A method of producing a composite material as defined in claim 8, wherein said layers are compressed so as to facilitate said synthetic reaction, and wherein said intermediate layer is formed by successively layering a plurality of laminates of varying component ratios so as to form said continuous gradient.

11. A method of producing a composite material as defined in claim 3, wherein said intermediate layer is formed so that the amount of said first component increases in a direction approaching said first layer and the amount of said second component increases in a direction approaching said second layer, and wherein said powder mixture is ignited by feeding electricity through metallic wires contacting said powder mixture.

12. A method of producing a composite material as defined in claim 11, wherein said first and second components comprise, respectively, a member selected from the group consisting of TiC and ZrC; TiB and SiC; and TiB and ZrB.

13. A method of producing a composite material as in claim 12, wherein said layers are compressed so as to facilitate said synthetic reaction, and wherein said intermediate layer is formed by successively layering a plurality of laminates of varying component ratios so as to form said continuous gradient.

14. A method of producing a composite material as defined in claim 2, wherein said intermediate layer is formed so that the amount of said first component increases in a direction approaching said first layer and the amount of said second component increases in a direction approaching said second layer, and wherein said powder mixture is ignited by feeding electricity through metallic wires contacting said powder mixture.

15. A method of producing a composite material as defined in claim 4, wherein said intermediate layer is formed so that the amount of said first component increases in a direction approaching said first layer and the amount of said second component increases in a direction approaching said second layer, and wherein said powder mixture is ignited by feeding electricity through metallic wires contacting said powder mixture.

16. A method of producing a composite material as defined in claim 6, wherein said intermediate layer is formed so that the amount of said first component increases in a direction approaching said first layer and the amount of said second component increases in a direction approaching said second layer, and wherein said powder mixture is ignited by feeding electricity through metallic wires contacting said powder mixture.

* * * * *

UNITED STATES PATENT AND TRADEMARK OFFICE
CERTIFICATE OF CORRECTION

PATENT NO. : 4,778,649
DATED : October 18, 1988
INVENTOR(S) : Niino et al

It is certified that error appears in the above-identified patent and that said Letters Patent is hereby corrected as shown below:

On the title page assignee should read

--(73)Assignee: National Aerospace Laboratories of Science & Technology Agency, Tokyo; Agency of Industrial Science and Technology, Tokyo; Daikin Industries, Ltd., Osaka, all of Japan --.

Signed and Sealed this

Fourteenth Day of March, 1989

Attest:

DONALD J. QUIGG

*Attesting Officer*   *Commissioner of Patents and Trademarks*